United States Patent
Candy

(10) Patent No.: US 8,063,777 B2
(45) Date of Patent: Nov. 22, 2011

(54) REAL-TIME RECTANGULAR-WAVE TRANSMITTING METAL DETECTOR PLATFORM WITH USER SELECTABLE TRANSMISSION AND RECEPTION PROPERTIES

(75) Inventor: Bruce Halcro Candy, Basket Range (AU)

(73) Assignee: Minelab Electronics Pty Ltd., Torrensville (AU)

( * ) Notice: Subject to any disclaimer, the term of this patent is extended or adjusted under 35 U.S.C. 154(b) by 612 days.

(21) Appl. No.: 12/158,441

(22) PCT Filed: Dec. 14, 2006

(86) PCT No.: PCT/AU2006/001897
§ 371 (c)(1),
(2), (4) Date: Nov. 12, 2008

(87) PCT Pub. No.: WO2007/070927
PCT Pub. Date: Jun. 28, 2007

(65) Prior Publication Data
US 2009/0315707 A1 Dec. 24, 2009

(30) Foreign Application Priority Data
Dec. 20, 2005 (AU) .............................. 2005907125

(51) Int. Cl.
*G08B 21/00* (2006.01)
(52) U.S. Cl. .............................. 340/540; 324/329
(58) Field of Classification Search .......... 340/540, 340/551, 657; 324/323, 326, 329
See application file for complete search history.

(56) References Cited

U.S. PATENT DOCUMENTS

| | | |
|---|---|---|
| 4,914,399 A | 4/1990 | Doany |
| 5,414,411 A | 5/1995 | Lahr |
| 5,523,690 A | 6/1996 | Rowan |
| 5,537,041 A | 7/1996 | Candy |
| 5,596,277 A | 1/1997 | Rowan |
| 5,642,050 A | 6/1997 | Shoemaker |
| 5,654,638 A | 8/1997 | Shoemaker |
| 6,043,647 A | 3/2000 | Shih |
| 6,172,504 B1 | 1/2001 | Earle |
| 6,421,621 B1 | 7/2002 | Earle |
| 6,879,161 B2 | 4/2005 | Rowan |
| 6,911,823 B2 | 6/2005 | Rowan |
| 7,088,103 B2 | 8/2006 | Kelley |
| 7,148,692 B2 | 12/2006 | Kelley |
| 7,649,356 B2 | 1/2010 | Earle |

OTHER PUBLICATIONS

International Preliminary Report on Patentability from PCT/AU2006/001897, mailed Jun. 24, 2008.
DFX Spectrum Instruction Manual, White's Electronics, Inc., 2000-2001, 60 pages.
DFX 300 Instruction Manual, White's Electronics, Inc., Mar. 2008, 60 pages.

*Primary Examiner* — Jeffery Hofsass
(74) *Attorney, Agent, or Firm* — Beyer Law Group LLP

(57) ABSTRACT

A highly flexible real-time metal detector platform which has a detection capability for different targets and applications, where the operator is able to alter synchronous demodulation multiplication functions to select different types or mixtures of different types to be applied to different synchronous demodulators, and also different waveforms of the said synchronous demodulation multiplication functions; examples of the different types being time-domain, square-wave, sine-wave or receive signal weighted synchronous demodulation multiplication functions. The operator can alter the fundamental frequency of the repeating switched rectangular-wave voltage sequence, and an operator may alter the waveform of the repeating switched rectangular-wave voltage sequence and corresponding synchronous demodulation multiplication functions.

20 Claims, 2 Drawing Sheets

REAL-TIME RECTANGULAR-WAVE TRANSMITTING METAL DETECTOR PLATFORM WITH USER SELECTABLE TRANSMISSION AND RECEPTION PROPERTIES

TECHNICAL FIELD

The current invention relates to a real-time metal detector platform which transmits a repeating switched wave voltage sequence and has particular application to hand-held coin, treasure, prospecting and landmine detectors.

BACKGROUND ART

Most commercial metal detectors operate in real-time including most handheld metal detectors designed to hunt for buried metal targets such as gold, coins, treasure and archaeological artifacts. Real-time means that output signal responds within a relatively short delay to any change in input signal; any delay being typically less than $1/10^{th}$ of a second.

Most metal detectors have a transmitter whose output is connected to a transmit coil for the transmission of alternating magnetic fields, a magnetic field receiving means such as a receive coil which is connected to signal processing and assessment electronics. The signal processing and assessment electronics usually includes a preamplifier whose output is connected to synchronous demodulators whose synchronous demodulation multiplication functions are synchronised to the transmitted alternating magnetic fields. The outputs of the synchronous demodulators are connected to low-pass filters or "demodulation filters" whose outputs are further processed for target identification and indication.

Some commercially available sinusoidal single-frequency transmitting metal detectors have switches which allow a user to select different frequencies. The electronics in such detectors is often relatively expensive. The ability to select different frequencies may be useful, for example, in gold nugget prospecting where the size of gold nuggets may vary from location to location and hence the optimal frequency for detection may also correspondingly vary.

U.S. Pat. No. 5,537,041 discloses a metal detector which transmits multi-period pulses and operates in the time-domain, as too do some commercially available pulse induction metal detectors; see for example U.S. Pat. No. 4,868,504 and U.S. Pat. No. 5,576,624. Time-domain detectors are claimed to be relatively susceptible to electromagnetic interference owing to wide receive bandwidths and extensive Fourier components of the synchronous demodulation multiplication functions, which in most cases have just 3 values; 0, +1 or −1.

U.S. Pat. No. 4,628,265 discloses a frequency-domain metal detector which applies a voltage square-wave signal to a transmit coil and the received fundamental and third harmonics are band-pass filtered and then synchronously demodulated. With this approach, only two frequencies are detected simultaneously owing to the narrow receive bandwidths of the band-pass filters.

U.S. Pat. No. 4,942,360 discloses a metal detector which detects more than one frequency simultaneously and operates in the frequency-domain. This is useful to reject magnetic soil signals and also to characterize targets. U.S. Pat. No. 5,506,506 discloses further steps to characterize targets in magnetic soils.

Some commercially available metal detectors use digital signal processing technology for sine-wave (and cosine) synchronously demodulation multiplication, as is also disclosed US2005/0253711. At least one of these commercial detectors also applies a square-wave voltage to a transmit coil and also detects the fundamental and third harmonic in the frequency-domain as does U.S. Pat. No. 4,628,285 but achieves this by sine-wave synchronously demodulation multiplication rather than exploiting the use of band-pass filters. The two systems in terms of signal-to-noise ratio are mathematically identical.

Some systems for detecting various geological profiles (such as water, salt, minerals) transmit a digital pulse width modulated voltage switching sequence with frequency components rich at various frequencies. These systems do not operate in real-time; that is a sequence record of data is first collected and then later processed after the collection. A complex fast Fourier transform is applied to the receive waveform recorded data from which a complex frequency profile of the environment may be indicated at the various rich transmit frequencies.

U.S. Pat. No. 6,686,742 patent discloses a metal detector wherein the synchronous demodulation multiplication functions are weighted more when the receive signal is relatively high, and weighted less when the receive signal is relatively less. This results in improved signal-to-noise ratio, particularly for fast time constant targets.

The advantage cited or assumed advantage for utilizing narrowband synchronous demodulation, such as sine-waves or band-pass filtering followed by synchronous demodulation multiplication, or by using complex fast Fourier transforms, all of which will yield the same signal-to-noise ratio, is that these techniques reduce both broad-band electronic noise and environmental magnetic interference.

An object of the current invention is to alleviate at least some of the problems of the prior art by offering an improved metal detector platform capability, or at least to provide the public with a useful alternative to known detectors.

A further object of this invention is to provide a real-time flexible metal detector platform improvement at relatively low cost that assists an operator such as a prospector in the location of metal targets.

SUMMARY OF INVENTION

There is a continuing need for metal detectors with improved signal-to-noise ratio capability that receive more than one frequency simultaneously as this improves detection range and improved target identification in mineralized or saline or both soils. Further, there is an advantage in providing a metal detector platform which has the capability of an operator using input controls to alter transmit and synchronous demodulation parameters such as transmit frequencies, transmit waveform, synchronous demodulation multiplication functions including time-domain and frequency-domain, preferably at low cost.

We have discovered that the generally accepted belief that narrowband synchronous demodulation has improved signal-to-noise ratio compared to wideband or broadband synchronous demodulation, is not generally true for rectangular-wave transmission where the rectangular-wave transmission includes substantial harmonic frequencies (harmonic distortion say >20%) of the fundamental transmitted frequencies, and the synchronous demodulation multiplication function are also broadband, for example a square-wave synchronous demodulation multiplication functions, or some time-domain synchronous demodulation multiplication functions.

The reasons for this are that electronic white noise adds only 10% more noise to the broadband square-wave synchronous demodulation multiplication function compared to narrow-band synchronous demodulation wherein the system gains of the narrowband and broadband systems are normalised to be the same when demodulating the fundamental frequency sine-wave only.

Except for some narrowband noise sources, most environmental magnetic noise very substantially dominates at the lower frequencies (e.g. say 2 kHz: a suitable lower frequency for a multi-frequency detector) in average noise environments not far from mains electricity. Thus there is far more interference at these lower frequencies than higher frequencies, and thus empirically there is rarely >10% more environmental noise from broadband square-wave synchronous demodulation than narrowband synchronous demodulation. In other words, if an environment interferes with broadband synchronous demodulation, it is likely that narrowband will also be effected to a similar degree. Sometimes in some very noisy magnetic environments narrowband demodulation results in a better signal-to-noise ratio.

However, the "signal" from the broadband synchronous demodulation may be greater than for narrow-band synchronous demodulation (amount depends on harmonic content of specific transmit waveform and synchronous demodulation multiplication function) because in effect useful target signals at higher harmonics are included in broadband synchronous demodulation. For example, the improvement for simple square-wave transmission and square-wave synchronous demodulation multiplication signal-to-noise ratio may be up to 23%. For the improvement to be useful, the odd harmonic distortion of the repeating switched rectangular-wave voltage sequence at a fundamental frequency for a square-wave synchronous demodulation multiplication function should be significant, say more than 20%, so that in essence when multiplied by the odd harmonics of the square-wave synchronous demodulation multiplication function, the harmonic products sum to more than the product of the first harmonics alone. Seen another simple way, the maximum average normalised output of a square-wave multiplied by a square-wave (of the same frequency) is 1 whereas it is $2/\pi$ for a square-wave multiplied, by a sine-wave, the peaks of the sine-wave and square-waves being +1 and −1.

In order to transmit at least two useful operational frequencies for discrimination or elimination of magnetic soil components, the frequency spectrum of the said repeating switched rectangular-wave voltage sequence should contain at least two spectral magnitude peaks which are not too dissimilar in magnitude, say within a magnitude factor of two of each other. A necessary condition for this is that there must be least two different time periods between successive alternating rapid switching voltage transitions of the said repeating switched rectangular-wave voltage sequence.

From an efficiency point of view, it is best of the lower frequency of the said at least two spectral magnitude peaks should be the first harmonic fundamental frequency of the said repeating switched rectangular-wave voltage sequence. From an environmental noise point of view, this is more advantageous than say having a lower first harmonic fundamental frequency than the effective operational frequencies as is the case in some time-domain commercial metal detectors.

Further, from an efficiency point of view, it is best if the spectral magnitude peak of the said repeating switched rectangular-wave voltage sequence of highest operational frequency should be double the reciprocal of a shortest period between the said successive alternating rapid switching voltage transitions of the said repeating switched rectangular-wave voltage sequence.

Thus the signal-to-noise maybe improved with broadband square-wave or time-domain synchronous demodulation multiplication function compared to narrowband synchronous demodulation.

In addition, this invention discloses metal detector platform systems that are relatively simple and flexible. For example, one such platform may be capable of user control of the transmit signal and synchronous demodulation multiplication functions. This control for example, may include the capability of a metal detector platform for which a user may select time-domain of frequency-domain synchronous demodulation, or a dual frequency mode suitable for detecting high conductivity coins or targets such as USA coins and civil-war belt buckles (say 2 kHz & 32 kHz), or dual frequency mode suitable for detecting low conductivity coins or targets such as European ancient coins (say 5 kHz & 80 kHz), or a triple frequency gold detector suitable for cancelling magnetic soil mineralisation and operating in both the time-domain and frequency-domain (say 4, 16 and 64 kHz).

Further, narrow-band synchronous demodulation in a real-time metal detector platform wherein a user may after the operational frequencies may sometimes be useful in very magnetically noisy environments. This requires the fundamental frequencies of synchronous demodulation multiplication functions to correspondingly alter. We have realised that narrow-band may be implemented by sine-wave and cosine-wave synchronous demodulation multiplication functions, or where an output of the (broadband) preamplifier is connected to filters, the filters are connected to inputs of a said synchronous demodulators, wherein the forward transfer function of the filter attenuates frequencies at the harmonics of the fundamental frequencies of the synchronous demodulation multiplication function applied to the synchronous demodulation to which each filter output is connected. The filters may contain low-pass or notch action or both, and may be implemented in hardware or software and the forward transfer functions of the filters need to be changed correspondingly if the operational frequencies are changed. From a signal-to-noise point of view these systems are identical and from a complexity point of view with rectangular-wave transmission, the filter may be easier to implement than sine and cosine synchronous demodulation multiplication functions.

Further still, the signal-to-noise ratio of a real-time metal detector platform in which an operator may alter the said synchronous demodulation multiplication functions may be improved by receive signal weighted synchronous demodulation multiplication functions. This is achieved by the receive signal weighted synchronous demodulation multiplication function having a greater absolute magnitude multiplication factor for a least some periods than other non-zero signal weighted synchronous demodulation multiplication function periods, corresponding to the time derivative magnitude of a receive signal at an output of the preamplifier or said filter resulting from a typical medium time constant or selected non-ferrous metal target under the influence of the said transmission of alternating magnetic fields from the said transmit coil and received by the said magnetic field receiving means. In other simpler words, when the receive signal is greater from a desired target, the synchronous demodulation multiplication forward transfer function is greater so that the product weightings correspond. The said receive signal weighted synchronous demodulation multiplication function may include time-domain synchronous demodulation multiplication function or frequency-domain synchronous demodulation multiplication function or both.

This improved signal-to-noise ratio through the use of the said receive signal weighted synchronous demodulation multiplication function normally requires it's magnitude frequency spectrum to contain higher magnitude harmonic content than say a square-wave, thus increasing the susceptibility to magnetic environmental noise. To reduce this susceptibility, it is best to relatively attenuated high frequencies, say all harmonics above the fifth being less than one tenth (<0.1) of the fundamental frequency of the said receive signal weighted synchronous demodulation multiplication function. A combination of this reduction (if any) plus the use of filters with selected time- and frequency-domain characteristics to take advantage of the weighting between the output of the preamplifier and synchronous demodulators will perform the same result effectively.

There is a need for a highly flexible real-time metal detector platform which has detection capabilities for different targets and applications. Advantageously, an operator might be able to alter synchronous demodulation multiplication functions to select different types or mixtures of different types to be applied to different synchronous demodulators, and also different waveforms of the said synchronous demodulation multiplication functions; examples of the different types being time-domain, square-wave, sine-wave or receive signal weighted synchronous demodulation multiplication functions.

Also an operator could advantageously alter the fundamental frequency of the repeating switched rectangular-wave voltage sequence, and an operator may alter the waveform of the repeating switched rectangular-wave voltage sequence and corresponding synchronous demodulation multiplication functions.

In one form of the invention, although this need not be the only or the broadest form, the invention may be said to be embodied in a real-time metal detector platform having a transmitter connected to a transmit coil for the transmission of alternating magnetic fields when operational, a magnetic field receiving means connected to signal processing and assessment electronic, the transmitter being adapted to apply a transmit signal to the said transmit coil when operational, such that the transmit signal consists of a repeating switched rectangular-wave voltage sequence consisting of at least two substantially constant voltages and alternating rapid switching voltage transitions between the said at least two substantially constant voltages, wherein the said repeating switched rectangular-wave voltage sequence contains at least two different time periods between successive alternating rapid switching voltage transitions, a frequency spectrum of the said repeating switched rectangular-wave voltage sequence contains a plurality of different spectral magnitude peaks, the highest magnitude of the said plurality of different spectral magnitude peaks being a highest magnitude spectral peak, one of the said different spectral magnitude peaks being at a first harmonic fundamental frequency of the said repeating switched rectangular-wave voltage sequence, wherein the said signal processing and assessment electronics contains synchronous demodulators, wherein a time-domain synchronous demodulation multiplication function, a first time-domain synchronous demodulation multiplication function, is applied to at least one of the said synchronous demodulators, such that the said time-domain synchronous demodulation multiplication function is zero or at least approximately zero value for at least one time period, a first time period, and wherein the said first time period commences during a said alternating rapid switching voltage transition and ends when the said time-domain synchronous demodulation multiplication function changes from zero or at least approximately zero value to a substantially non-zero value, and wherein a sum of products of the said time-domain synchronous demodulation multiplication function multiplied by receive signal transients resulting from the said alternating rapid switching voltage transitions applied to an input of the synchronous demodulator to which the said time-domain synchronous demodulation multiplication function is applied, is approximately zero, the said first time-domain synchronous demodulation multiplication function is of a first fundamental frequency, the first fundamental frequency being synchronous with a frequency of said different spectral magnitude peak of the said repeating switched rectangular-wave voltage sequence, an output of the said signal processing and assessment electronics indicates the presence of selected environmental magnetic properties under the influence of the transmission alternating magnetic fields, the said synchronous demodulators being implemented either in hardware or software or a combination of hardware and software.

In preference, the detector is further characterised in that a square-wave synchronous demodulation multiplication function of a second fundamental frequency is applied to at least one of the said synchronous demodulators, and a time-domain synchronous demodulation multiplication function of a third fundamental frequency is applied to at least another of the said synchronous demodulators, the said second fundamental frequency and third fundamental frequency each being synchronous with a frequency of a said different spectral magnitude peaks of the said repeating switched rectangular-wave voltage sequence.

In preference the metal detector platform as in any one of the preceding claims further characterised in that at least the said first fundamental frequency or the said second fundamental frequency or the said third fundamental frequency equals the said first harmonic fundamental frequency.

In preference, the detector is further characterised in that the a frequency of a said spectral magnitude peak of the said frequency spectrum of the said repeating switched rectangular-wave voltage sequence within a magnitude factor of two of the magnitude of the said highest magnitude spectral peak, is at a highest operational frequency, wherein the said highest operational frequency equals half the reciprocal of a shortest period between successive said alternating rapid switching voltage transitions of the said repeating switched rectangular-wave voltage sequence, and wherein at least one fundamental frequency of a synchronous demodulation multiplication function applied to a said synchronous demodulator is at the said highest operational frequency.

In preference, the detector is further characterised in that the said signal processing and assessment electronics contains a broadband preamplifier with low-pass filtering action with a −3 dB frequency cut-off of at least greater than the said highest operational frequency, wherein the magnetic field receiving means is connected to an input of the broadband preamplifier and an output of the broadband preamplifier is connected to the said synchronous demodulators, or further filters.

In preference, the detector is further characterised in that a said time-domain synchronous demodulation multiplication function is substantially non-zero for periods in the latter half of a period between two successive alternating rapid switching voltage transitions, and an output of a synchronous demodulator to which the said synchronous demodulation multiplication function of substantially non-zero value for periods in the latter half of a period between two successive alternating rapid switching voltage transitions is applied, is processed by the said processing and assessment electronics to assess and indicate a ferrous nature of a metal target under the influence of the transmission alternating magnetic fields.

In preference, the detector is further characterised in that an operator may alter at least one of the said square-wave synchronous demodulation multiplication functions to select a different said square-wave synchronous demodulation multiplication function.

In preference the real-time metal detector platform is further characterised in that an operator may alter at least one of the said time-domain synchronous demodulation multiplication functions to select a different said time-domain synchronous demodulation multiplication function.

In preference, the detector is further characterised in that an operator may alter at least one of the said time-domain synchronous demodulation multiplication functions and square-wave synchronous demodulation multiplication functions to select a different said time-domain synchronous demodulation multiplication function or a different square-wave synchronous demodulation multiplication function, or a different said time-domain synchronous demodulation multiplication function and a different square-wave synchronous demodulation multiplication function.

In preference, the detector is further characterised wherein an output of the said broadband preamplifier is connected to at least one said filter, the filter is connected to an input of at least one said synchronous demodulator, wherein a forward transfer function of the filter attenuates frequencies at the harmonics of the fundamental frequency of the synchronous demodulation multiplication function applied to the said synchronous demodulator to which the said filter is connected, wherein the filter may contain any combination of low-pass or notch action or both, and may be implemented in hardware or software, and wherein an operator may alter the said fundamental frequency of the said synchronous demodulation multiplication function applied to the said synchronous demodulator to which the said filter is connected, and the said forward transfer function of the filter may be altered correspondingly.

In preference, the detector is further characterised in that an operator may alter at least one of the said synchronous demodulation multiplication functions to select sine-wave synchronous demodulation multiplication functions.

In preference, the detector is further characterized in that an operator may alter at least one of the said synchronous demodulation multiplication functions to select a receive signal weighted synchronous demodulation multiplication function, wherein the said receive signal weighted synchronous demodulation multiplication function has a greater absolute magnitude multiplication factor for a least some periods than other substantially non-zero signal weighted synchronous demodulation multiplication function periods, when a magnitude of a time derivative of a receive signal at an output of the said broadband preamplifier or said filter resulting from a metal target under the influence of the said transmission of alternating magnetic fields from the said transmit coil and received by the said magnetic field receiving means, is greater than during other periods, the said receive signal weighted synchronous demodulation multiplication function may include time-domain synchronous demodulation multiplication function or frequency-domain synchronous demodulation multiplication function or both.

In preference, the detector is further characterised in that the said receive signal weighted synchronous demodulation multiplication function has a magnitude frequency spectrum relatively attenuated in high frequencies, all harmonics of the said magnitude frequency spectrum above the fifth being less than one tenth ($<0.1$) of the fundamental frequency of the said receive signal weighted synchronous demodulation multiplication function.

In preference, the detector is further characterised in that an operator may alter at least one type of synchronous demodulation multiplication functions such as time-domain synchronous demodulation multiplication functions, square-wave synchronous demodulation multiplication functions, sine-wave synchronous demodulation multiplication functions or receive signal weighted synchronous demodulation multiplication function applied to a synchronous demodulator to a different type of synchronous demodulation multiplication function applied to the same said synchronous demodulator.

In preference, an operator may alter the said fundamental frequency of the said repeating switched rectangular-wave voltage sequence or the waveform of the said repeating switched rectangular-wave voltage sequence or the said repeating switched rectangular-wave voltage sequence and synchronous demodulation multiplication functions.

In preference, the said broadband preamplifier has a slew rate limit exceeding the maximum expected slew rate.

BRIEF DESCRIPTION OF THE DRAWINGS

For a better understanding of this invention it will now be described with respect to the preferred embodiment which shall be described herein with the assistance of drawings wherein.

DETAILED DESCRIPTION OF THE INVENTION

Figure 1:
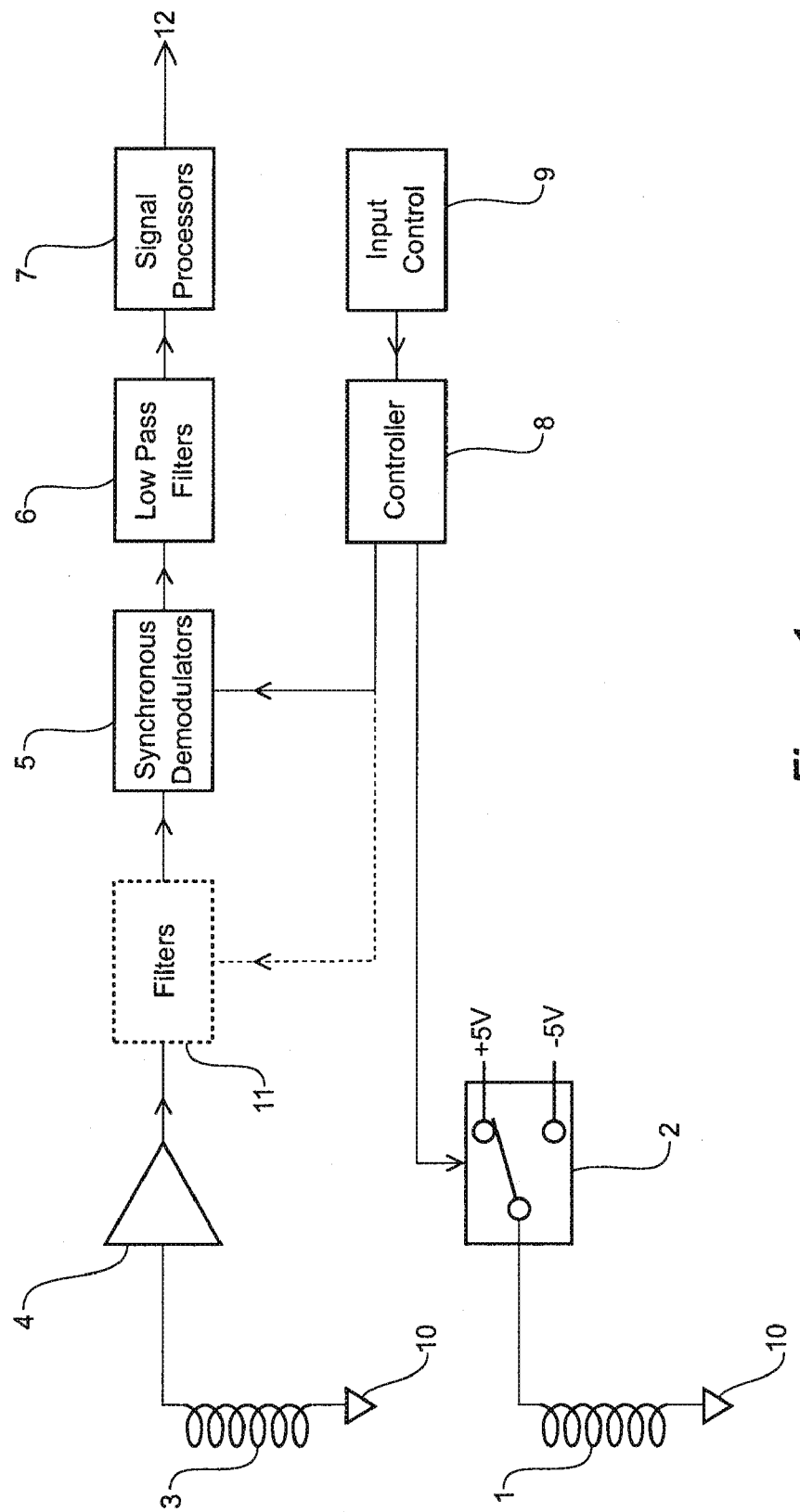
FIG. 1 shows a block electronic circuit diagram of a preferred embodiment.

FIG. 1 shows a real-time metal detector platform wherein a transmit signal consists of a repeating switched rectangular-wave voltage sequence consisting of at least two substantially constant voltages and alternating rapid switching voltage transitions is generated by a transmitter shown a switching electronics 2 is applied to a transmit coil 1. Signals from a magnetic field receiving means shown here as a receive coil 3 are amplified by a preamplifier 4 and applied to synchronous demodulators 5. The output of these demodulators is fed to low-pass filters 6 and thence to further signal processors 7 which for example determine the ferrous nature of the environment under the influence of the transmit field generated by the transmit coil 1. The signal processors 7 provide a useful output signal 12, such as an audio alert or visual display. Both the transmitter and synchronous demodulators are controlled by a controller 8 which includes a clock to control timing. An operator selects the frequency profile of the synchronous demodulation multiplying functions and transmit waveforms and frequencies by an input control 9 such as switches or the Internet for example. The system earth is shown as 10. Filters 11 which may include notch or low-pass or both may be connected between the broadband preamplifier 4 and the synchronous demodulators 5. The filter frequencies may also be controlled by controller 8. Many of the functions may be included physically in less devices, for example a DSP chip with an A-D converter may perform the functions of blocks 5, 6, 7, 8 and 11 or some different combination, the said blocks 5, 6, 7 8 and 11 may be thought of as signal processing and assessment electronics.

A simple low cost platform capable of time-domain and square-wave synchronous demodulation multiplication functions which may include receive signal weighted synchronous demodulation multiplication functions may be implemented for example by the use of analogue switches for synchronous demodulation followed by simple low-pass filters which feed a low cost multiplexer, A-D converter and microprocessor. Further low-pass filtering and target assessment algorithms may occur in the microprocessor. Outputs from the microprocessor may indicate the presence of selected environmental magnetic properties under the influence of the transmission alternating magnetic fields, and other outputs may include timing signals for the synchronous demodulator switches and for the transmit signal repeating switched rectangular-wave voltage sequence. These timing signals may be altered by user control which alters inputs to the microprocessor.

Figure 2:
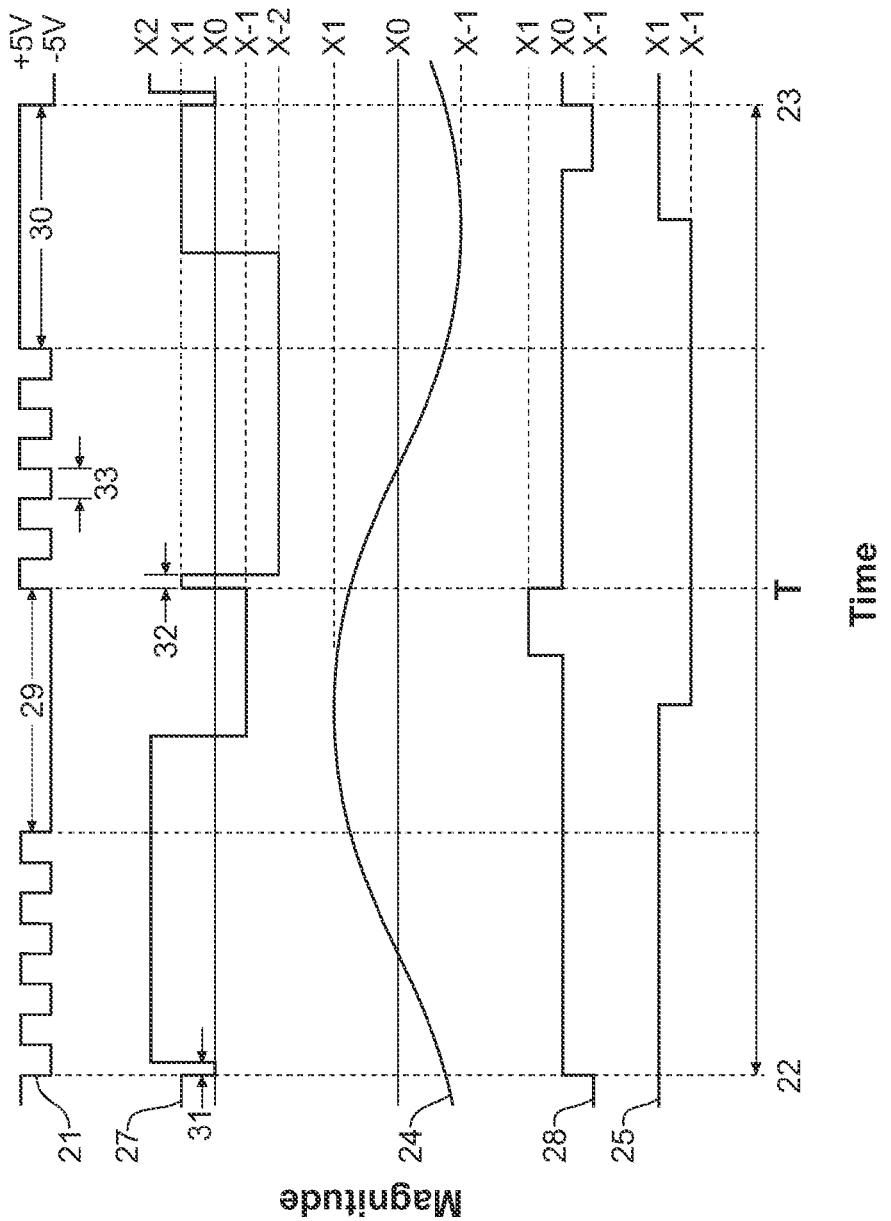
FIG. 2 shows an example of a switched voltage signal consists of a multi-period rectangular waveform whose Fourier transform is rich at least at 2 frequencies, and examples of some synchronous demodulation multiplication functions.

FIG. 2 shows an example of a said repeating switched rectangular-wave voltage sequence 21 which has a magnitude frequency spectrum with two strong different spectral magnitude peaks, one peak of fundamental period T (between 22 and 23) and thus first harmonic fundamental frequency 1/T, and the other peak of a second frequency 16/T, wherein the magnitudes of the said at least two different spectral magnitude peaks are within a factor of two in magnitude of each other.

FIG. 2 also gives examples of demodulation synchronous demodulation multiplication functions with fundamental frequencies equal to the first harmonic fundamental frequency 1/T; sine-wave synchronous demodulation multiplication function 24, square-wave synchronous demodulation multiplication function 25, time-domain synchronous demodulation multiplication function waveform 27 which is also a receive signal weighted synchronous demodulation multiplication function (5 discrete values). This function containing significant harmonics above the $5^{th}$ which may increase susceptibility to environmental magnetic noise. For less noise susceptibility it is better if this waveform was low-pass filtered or alternatively, low-pass filtering may be applied to the preamplifier to attenuate high frequencies or a filter inserted between the broadband preamplifier and synchronous demodulators to attenuate high frequencies, the filter being selected for both time-domain and frequency-domain characteristics to take advantage of the potential signal-to-noise improvement.

In order to attenuate soil salt content signals which have very fast decay signals following a alternating rapid switching voltage transitions of the repeating switched rectangular-wave voltage sequence applied to the transmit coil (at times 22 and 23), the time-domain synchronous demodulation multiplication function 27 is zero for a period following two of the said alternating rapid switching voltage transitions, namely during periods 31. Further, in this example, the sum of products of the said time-domain synchronous demodulation multiplication function 27 multiplied by receive signal transients resulting from the said alternating rapid switching voltage transitions applied to an input of the synchronous demodulator to which the said time-domain synchronous demodulation multiplication function is applied, approximately sum to zero. In other words the receive signal transients resulting from alternating rapid switching voltage transitions multiplied by the time-domain synchronous demodulation multiplication function 27 cancel owing to positive going transients cancelling with negative going transients.

Frequency-domain may also include receive signal weighted synchronous demodulation multiplication functions. For example the square-wave synchronous demodulation multiplication function 25 may be modified to have greater multiplication during periods of stronger receive signal similar to the weighting shown for waveform 27 for example.

FIG. 2 also shows another time-domain synchronous demodulation multiplication function 28 for ferrous assessment of the ferrous nature of a target, the forward transfer function being non-zero only in the latter half of the long pulses 29 and 30.

Note that the synchronous demodulation multiplication functions 27, 24 and 25 are "resistive," that is the pure reactive component is cancelled, whereas this is not so for the synchronous demodulation multiplication function 28.

Similar synchronous demodulation multiplication functions may be formed at a high frequency fundamental period of T/16 which is double the period 33 to demodulate the strong transmit signal frequency 16/T, a highest operational frequency. This said highest operational frequency equals half the reciprocal of a shortest period 33 between the said successive alternating rapid switching voltage transitions of the said repeating switched rectangular-wave voltage sequence.

The preamplifier, a broadband preamplifier has low-pass filtering action which should ideally pass the frequency 16/T without significant attenuation for best results. Thus the −3 dB frequency cut-off should be at least say more than the frequency 16/T, the said highest operational frequency.

The broadband preamplifier's slew rate limit should exceed the maximum expected slew rate to avoid inaccuracies.

Using an input control 9 such as switches or some other input an operator may alter the said fundamental frequency of the said repeating switched rectangular-wave voltage sequence, and/or the waveform of the said repeating switched rectangular-wave voltage sequence and/or the synchronous demodulation multiplication functions to select square-wave and/or time-domain and/or sine-wave synchronous and/or receive signal weighted synchronous demodulation multiplication functions or any other synchronous demodulation multiplication function. These parameters may easily be changed using digital technology. For example, in terms of transmit frequency only, it would be useful to set 1/T at say 2 kHz if an operator is seeking USA coins, Bronze-age or copper-age tools which are relatively conductive, or 1/T would be better set to say 6 kHz to seek small gold nuggets or many ancient European coins which exhibit relatively short eddy current time decays.

In this specification:

"time-domain" means that the synchronous demodulation multiplication function is near or at zero for at least one time period, a first time period, wherein the said first time period commences during a said alternating rapid switching voltage transition and ends when the said time-domain synchronous demodulation multiplication function changes from zero value to a substantially non-zero value;

"frequency-domain" means broadband square-wave synchronous demodulation multiplication function unless otherwise stated or implied;

"narrowband synchronous demodulation" means either sine-wave synchronous demodulation multiplication or filtering of input signal harmonic frequencies followed by synchronous demodulation multiplication;

"broadband" means that the preamplifier is a broadband preamplifier with low-pass filtering action with a 3 dB frequency cut-off of at least greater that of the highest fundamental frequency of the synchronous demodulation multiplication functions;

"square-wave synchronous demodulation multiplication function" is effectively non-zero at all times and generally has just 2 discrete values (example +1, −1), although this may include weighting to include several discrete values if specified (example +2, +1, −1, −2).

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A real-time metal detector platform having a transmitter connected to a transmit coil for the transmission of alternating magnetic fields when operational, a magnetic field receiving means connected to signal processing and assessment electronics, the transmitter being adapted to apply a transmit signal to the said transmit coil when operational, such that the transmit signal consists of a repeating switched rectangular-wave voltage sequence consisting of at least two substantially constant voltages and alternating rapid switching voltage transitions between the said at least two substantially constant voltages, wherein the said repeating switched rectangular-wave voltage sequence contains at least two different time periods between successive alternating rapid switching voltage transitions, a frequency spectrum of the said repeating switched rectangular-wave voltage sequence contains a plurality of different spectral magnitude peaks, the highest magnitude of the said plurality of different spectral magnitude peaks being a highest magnitude spectral peak, one of the said different spectral magnitude peaks being at a first harmonic fundamental frequency of the said repeating switched rectangular-wave voltage sequence, wherein the said signal processing and assessment electronics contains synchronous demodulators, wherein a time-domain synchronous demodulation multiplication function, a first time-domain synchronous demodulation multiplication function, is applied to at least one of the said synchronous demodulators, such that the said time-domain synchronous demodulation multiplication function is zero or at least approximately zero value for at least one time period, a first time period, and wherein the said first time period commences during a said alternating rapid switching voltage transition and ends when the said time-domain synchronous demodulation multiplication function changes from zero or at least approximately zero value to a substantially non-zero value, and wherein a sum of products of the said time-domain synchronous demodulation multiplication function multiplied by receive signal transients resulting from the said alternating rapid switching voltage transitions applied to an input of the synchronous demodulator to which the said time-domain synchronous demodulation multiplication function is applied, is approximately zero, the said first time-domain synchronous demodulation multiplication function is of a first fundamental frequency, the first fundamental frequency being synchronous with a frequency of said different spectral magnitude peak of the said repeating switched rectangular-wave voltage sequence, an output of the said signal processing and assessment electronics indicates the presence of selected environmental magnetic properties under the influence of the transmission alternating magnetic fields, the said synchronous demodulators being implemented either in hardware or software or a combination of hardware and software.

2. A real-time metal detector platform as in claim 1 further characterised in that a magnitude of the said spectral magnitude peak at a first harmonic fundamental frequency of the said repeating switched rectangular-wave voltage sequence and magnitude of the said highest magnitude spectral peak are within a factor of two in magnitude of each other.

3. A real-time metal detector platform as in claim 1 further characterised in that a square-wave synchronous demodulation multiplication function of a second fundamental frequency is applied to at least one of the said synchronous demodulators, and a time-domain synchronous demodulation multiplication function of a third fundamental frequency is applied to at least another of the said synchronous demodulators, the said second fundamental frequency and third fundamental frequency each being synchronous with a frequency of a said different spectral magnitude peaks of the said repeating switched rectangular-wave voltage sequence.

4. A real-time metal detector platform as in claim 1 further characterised in that at least the said first fundamental frequency or the said second fundamental frequency or the said third fundamental frequency equals the said first harmonic fundamental frequency.

5. A real-time metal detector platform as in claim 1 further characterised in that the a frequency of a said spectral magnitude peak of the said frequency spectrum of the said repeating switched rectangular-wave voltage sequence within a magnitude factor of two of the magnitude of the said highest magnitude spectral peak, is at a highest operational frequency, wherein the said highest operational frequency equals half the reciprocal of a shortest period between successive said alternating rapid switching voltage transitions of the said repeating switched rectangular-wave voltage sequence, and wherein at least one fundamental frequency of a synchronous demodulation multiplication function applied to a said synchronous demodulator is at the said highest operational frequency.

6. A real-time metal detector platform as in claim 1 further characterised in that the said signal processing and assessment electronics contains a broadband preamplifier with low-pass filtering action with a −3 dB frequency cut-off of at least greater than the said highest operational frequency, wherein the magnetic field receiving means is connected to an input of the broadband preamplifier and an output of the broadband preamplifier is connected to the said synchronous demodulators, or further filters.

7. A real-time metal detector platform as in claim 1 further characterised in that a said time-domain synchronous demodulation multiplication function is substantially non-zero for periods in the latter half of a period between two successive alternating rapid switching voltage transitions, and an output of a synchronous demodulator to which the said synchronous demodulation multiplication function of substantially non-zero value for periods in the latter half of a period between two successive alternating rapid switching voltage transitions is applied, is processed by the said processing and assessment electronics to assess and indicate a ferrous nature of a metal target under the influence of the transmission alternating magnetic fields.

8. A real-time metal detector platform as in claim 1 further characterised in that an operator may alter at least one of the said square-wave synchronous demodulation multiplication functions to select a different said square-wave synchronous demodulation multiplication function.

9. A real-time metal detector platform as in claim 1 further characterised in that an operator may alter at least one of the said time-domain synchronous demodulation multiplication functions to select a different said time-domain synchronous demodulation multiplication function.

10. A real-time metal detector platform as in claim 1 further characterised in that an operator may alter at least one of the said time-domain synchronous demodulation multiplication functions and square-wave synchronous demodulation multiplication functions to select a different said time-domain synchronous demodulation multiplication function or a different square-wave synchronous demodulation multiplication function, or a different said time-domain synchronous demodulation multiplication function and a different square-wave synchronous demodulation multiplication function.

11. A real-time metal detector platform as in claim 1 further characterised wherein an output of the said broadband preamplifier is connected to at least one said filter, the filter is connected to an input of at least one said synchronous demodulator, wherein a forward transfer function of the filter attenuates frequencies at the harmonics of the fundamental frequency of the synchronous demodulation multiplication function applied to the said synchronous demodulator to which the said filter is connected, wherein the filter may contain any combination of low-pass or notch action or both, and may be implemented in hardware or software, and wherein an operator may alter the said fundamental frequency of the said synchronous demodulation multiplication function applied to the said synchronous demodulator to which the said filter is connected, and the said forward transfer function of the filter may be altered correspondingly.

12. A real-time metal detector platform as in claim 1 further characterised in that an operator may alter at least one of the said synchronous demodulation multiplication functions to select sine-wave synchronous demodulation multiplication functions.

13. A real-time metal detector platform as in claim 1 further characterised in that an operator may alter at least one of the said synchronous demodulation multiplication functions to select a receive signal weighted synchronous demodulation multiplication function, wherein the said receive signal weighted synchronous demodulation multiplication function has a greater absolute magnitude multiplication factor for a least some periods than other substantially non-zero signal weighted synchronous demodulation multiplication function periods, when a magnitude of a time derivative of a receive signal at an output of the said broadband preamplifier or said filter resulting from a metal target under the influence of the said transmission of alternating magnetic fields from the said transmit coil and received by the said magnetic field receiving means, is greater than during other periods, the said receive signal weighted synchronous demodulation multiplication function may include time-domain synchronous demodulation multiplication function or frequency-domain synchronous demodulation multiplication function or both.

14. A real-time metal detector platform as in claim 13 further characterised in that the said receive signal weighted synchronous demodulation multiplication function has a magnitude frequency spectrum relatively attenuated in high frequencies, all harmonics of the said magnitude frequency spectrum above the fifth being less than one tenth of the fundamental frequency of the said receive signal weighted synchronous demodulation multiplication function.

15. A real-time metal detector platform as in claim 1 further characterised in that an operator may alter a synchronous demodulation multiplication function applied to a synchronous demodulator.

16. A real-time metal detector platform as in claim 1 further characterised in that an operator may alter at least one type of synchronous demodulation multiplication functions such as time-domain synchronous demodulation multiplication functions, square-wave synchronous demodulation multiplication functions, sine-wave synchronous demodulation multiplication functions or receive signal weighted synchronous demodulation multiplication function applied to a synchronous demodulator to a different type of synchronous demodulation multiplication function applied to the same said synchronous demodulator.

17. A real-time metal detector platform as in claim 1 further characterised in that an operator may alter the said fundamental frequency of the said repeating switched rectangular-wave voltage sequence.

18. A real-time metal detector platform as in claim 1 further characterised in that an operator may alter the waveform of the said repeating switched rectangular-wave voltage sequence.

19. A real-time metal detector platform as in claim 1 further characterised in that an operator may alter the said repeating switched rectangular-wave voltage sequence and synchronous demodulation multiplication functions.

20. A real-time metal detector platform as in claim 1 further characterised in that the said broadband preamplifier has a slew rate limit exceeding the maximum expected slew rate.

* * * * *